United States Patent
Stoelzer

(10) Patent No.: US 9,664,189 B2
(45) Date of Patent: May 30, 2017

(54) HYDROSTATIC PISTON ENGINE HAVING A BRAKE DEVICE

(75) Inventor: Rainer Stoelzer, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 603 days.

(21) Appl. No.: 13/996,808

(22) PCT Filed: Nov. 8, 2011

(86) PCT No.: PCT/EP2011/005598
§ 371 (c)(1),
(2), (4) Date: Sep. 5, 2013

(87) PCT Pub. No.: WO2012/084092
PCT Pub. Date: Jun. 28, 2012

(65) Prior Publication Data
US 2013/0333369 A1     Dec. 19, 2013

(30) Foreign Application Priority Data

Dec. 23, 2010  (DE) ................. 10 2010 055 970
May 27, 2011  (DE) ................. 10 2011 076 581

(51) Int. Cl.
*F04C 15/00* (2006.01)
*B60T 1/06* (2006.01)
(Continued)

(52) U.S. Cl.
CPC .......... *F04C 15/0084* (2013.01); *B60T 1/065* (2013.01); *B60T 11/10* (2013.01);
(Continued)

(58) Field of Classification Search
CPC .......... F16D 55/36; F16D 55/40; B60T 1/065; B60T 5/00
(Continued)

(56) References Cited

U.S. PATENT DOCUMENTS 3,752,268 A  *  8/1973  Gfeller ................ 188/181 A
4,244,276 A       1/1981  Iwata
(Continued)

FOREIGN PATENT DOCUMENTS

DE      42 14 397 A1    11/1993
DE     101 28 209 A1     1/2003
(Continued)

OTHER PUBLICATIONS

Trinkel, Bud. Sequence Valves and Reducing Valves. Hydraulics and Pneumatics, Book2, Chapter 14, Apr. 18, 2007. [online] [retrieved May 27, 2015] Retrieved from the Internet <URL http://hydraulicspneumatics.com/other-technologies/chapter-14-sequence-valves-andreducing-valves>.*
(Continued)

*Primary Examiner* — F. Daniel Lopez
*Assistant Examiner* — Richard Drake
(74) *Attorney, Agent, or Firm* — Maginot, Moore & Beck LLP

(57) ABSTRACT

A hydrostatic piston engine includes an actuating element configured to actuate a brake device to produce a braking force on a rotor of the piston engine. The actuating element is configured to release the brake device when a hydraulic force acts on the actuating element. The hydraulic force prevails in a pressure chamber which is connected to a pressure medium source via a first throttle point. The pressure chamber is also configured to be connected to a pressure medium sink. The hydrostatic piston engine also includes a pressure retention valve device configured to open in a direction of the pressure medium sink. The pressure retention valve device is disposed between the pressure chamber and the pressure medium sink. The opening pressure of the pressure retention valve device is at least equal to the
(Continued)

pressure in the pressure chamber which is necessary to release the brake device.

17 Claims, 4 Drawing Sheets

(51) Int. Cl.
| | |
|---|---|
| *B60T 11/10* | (2006.01) |
| *F16D 55/28* | (2006.01) |
| *F16D 55/36* | (2006.01) |
| *F04B 1/20* | (2006.01) |
| *F16D 55/00* | (2006.01) |
| *F16D 121/06* | (2012.01) |
| *F16D 125/06* | (2012.01) |

(52) U.S. Cl.
CPC .......... *F04B 1/2035* (2013.01); *F04B 1/2042* (2013.01); *F16D 55/28* (2013.01); *F16D 55/36* (2013.01); *F16D 2055/0058* (2013.01); *F16D 2121/06* (2013.01); *F16D 2125/06* (2013.01)

(58) Field of Classification Search
USPC .............................. 91/41; 60/435, 436; 92/20
See application file for complete search history.

(56) References Cited

U.S. PATENT DOCUMENTS

| | | | |
|---|---|---|---|
| 4,567,965 A * | 2/1986 | Woodruff | B64C 11/385 188/170 |
| 5,320,419 A | 6/1994 | Inagawa | |
| 5,884,984 A | 3/1999 | Arai et al. | |
| 6,152,269 A * | 11/2000 | Malvestio | 188/106 P |
| 6,336,323 B1 * | 1/2002 | Tanabe et al. | 60/442 |
| 6,357,558 B1 | 3/2002 | Case et al. | |
| 6,543,222 B1 | 4/2003 | Case et al. | |
| 2002/0038735 A1 * | 4/2002 | Tanabe | 180/197 |
| 2005/0109569 A1 * | 5/2005 | Sporzynski et al. | 188/218 XL |

FOREIGN PATENT DOCUMENTS

| | | |
|---|---|---|
| DE | 103 41 331 B3 | 5/2005 |
| DE | 600 27 233 T2 | 2/2007 |
| EP | 0 913 304 A2 | 5/1999 |
| JP | 2000-220560 A | 8/2000 |

OTHER PUBLICATIONS

International Search Report corresponding to PCT Application No. PCT/EP2011/005598, mailed Sep. 4, 2013 (German language document) (9 pages).

* cited by examiner

HYDROSTATIC PISTON ENGINE HAVING A BRAKE DEVICE

This application is a 35 U.S.C. §371 National Stage Application of PCT/EP2011/005598, filed on Nov. 8, 2011, which claims the benefit of priority to Serial Nos. DE 10 2010 055 970.9, filed on Dec. 23, 2010 and DE 10 2011 076 581.6, filed on May 27, 2011 in Germany, the disclosures of which are incorporated herein by reference in their entirety.

The disclosure relates to a hydrostatic piston engine having a brake device.

BACKGROUND

Hydrostatic drives are frequently used as traction drives in mobile working machines. The hydrostatic drives also often have a parking brake, in order to prevent rolling away in the case of a leakage of the hydraulic circuit. In the case of a leakage of this type, hydraulic blocking is not active and a vehicle which is standing, for example, on a hill can roll away. In order to ensure safe parking, as a rule a spring-loaded brake device is used as parking brake which is released during operation by a hydraulic pressure. A system of this type is known, for example, from U.S. Pat. No. 5,884,984. In said document, during traction operation, a piston is loaded counter to the force of a spring by a pressure medium source; this can be, for example, the delivery-side working lines. In order to relieve the pressure space, in which the piston is loaded with the pressure, a connecting line to a tank volume is provided, in which connecting line a throttle point is arranged. A further throttle point is provided between the pressure medium source and the pressure space.

This arrangement has the disadvantage that, in the case of an input-side pressure drop, as can occur, for example, when driving off in traction drives or else when the hydraulic motor outperforms the hydraulic pump, the pressure for opening the brake device can drop, even if possibly only briefly, with the result that an undesired engagement of the parking brake occurs.

Moreover, it is known from U.S. Pat. No. 6,357,558 to connect a pressure space of a brake device of a hydrostatic engine to a cooling circuit via a calibrated non-return valve. The pressure medium which is fed to the pressure space in order to release the brake can be used via the calibrated non-return valve for cooling the brake device which is configured as a multiple disk brake. The actuation of the brake and the interaction with the non-return valve are not described, however.

The disclosure is then based on the object of preventing unintentional activation of the brake device and of it being possible to keep the pressure which is required to release the brake device at as low a level as possible.

The object is achieved by the disclosure by way of the features described herein.

The hydrostatic piston engine according to the engine has a brake device for producing a braking force on a rotor of the piston engine. An actuating element is provided for actuating the brake device, which actuating element, in order to release the brake device, can be loaded with a hydraulic force. Said hydraulic force acts in the form of a pressure medium in a pressure space on a surface of the actuating element. The pressure space is connected to a throttle point in order to reduce the pressure which results from the pressure medium which is made available by the pressure medium source, with the result that the supplied pressure medium can flow from the pressure medium source via the throttle point into the pressure space. Furthermore, the pressure space can be connected to a pressure medium sink, for example the tank volume or the inner housing volume of the hydrostatic piston engine. The pressure level of the pressure medium sink can be assumed to be constant, with the result that a change in the pressure on the side of the pressure medium source results in a corresponding change in the pressure in the pressure space, which pressure acts in the pressure space.

According to the prior art, a further throttle point is provided in the connection between the pressure space and the pressure medium sink. The pressure which is set in the pressure space is therefore dependent on the cross-sectional areas of the two throttle points or nozzles and the pressure of the pressure medium source and of the pressure medium sink. In order to keep the pressure level at a level which is suitable for reliably releasing the brake device without complicated alternative measures, even in the case of a brief drop on the side of the pressure medium source, the pressure level overall has to be relatively high, that is to say, during normal operation, increased considerably in comparison with the minimum pressure for releasing the brake device. In order to avoid this, according to the disclosure, a pressure-holding valve device is then provided between the pressure space and the pressure medium sink in addition to the throttle point which is present upstream of the pressure space in order to reduce the pressure of the pressure medium source to a suitable level for releasing the brake device. Said pressure-holding valve device opens in the direction of the pressure medium sink and has an opening pressure which is at least equal to the pressure in the pressure space which is required to release the brake device. Here, at least equal means that it preferably also lies slightly higher, in order to ensure the release of the brake device even in the case of fluctuations, which are to be taken into consideration, of the parameters of the system, such as pressure medium temperature and therefore viscosity.

The hydrostatic piston engine according to the disclosure has the advantage that, in the case of a pressure drop on the side of the pressure medium source, the non-return valve closes as a result of the pressure-holding valve device before the pressure in the pressure space drops to such an extent that the release of the brake device is no longer ensured.

The description relates to advantageous developments of the hydrostatic piston engine according to the disclosure.

SUMMARY

In particular, it is advantageous if a further throttle point is formed parallel to the pressure-holding valve device, via which further throttle point the pressure space is connected to the pressure medium sink. The configuration of this additional flow path, by way of which the pressure space can be relieved into the pressure medium sink, has the advantage that, in the case of a desired pressure drop, pressure medium can flow out slowly from the pressure space into the pressure medium sink despite the closed non-return valve. This is the case, for example, when the supply from the pressure medium source is interrupted, in order to bring the brake device into the engaging state in a targeted manner when parking the vehicle. Without it being necessary to provide a further separately controlled relief means for the pressure space, the further relief of the pressure space into the pressure medium sink is then made possible in the case of a pressure-holding valve device which is already closed. The corresponding throttle cross section is comparatively small, in order to ensure that, during a brief, undesired pressure drop on the input side of the pressure space, pressure dissipation does not take place in the pressure space via said throttle point, which pressure dissipation after all ultimately leads to undesired application of the brake device.

In order to achieve a compact overall size, the pressure-holding valve device is, in particular, configured as a pressure sequence valve. This has the advantage that no additional channels are required and the provision of the parallel further throttle point is already possible in the region of the closing body.

In particular, it is advantageous if the pressure-holding valve device is provided in the actuating element itself. The actuating element is arranged, like the entire brake device, in the hydrostatic piston engine, with the result that the arrangement of the pressure-holding valve device in the actuating element connects the pressure space in a simple way to the remaining housing inner volume. Here, the housing inner volume forms the pressure medium sink, with the result that the additional provision of external or integrated channels for relieving the pressure space is not required. This simplifies production considerably.

It is particularly advantageous if the actuating element is configured as a thrust ring made from plastic. This lowers the production costs further, since material-removing machining in the case of a plastic ring of this type is either not required or else is less complicated than in the case of the metal thrust rings which have previously been used as a rule. Furthermore, the provision of the installation space for receiving the pressure-holding valve device into the plastic ring is particularly simple, since the corresponding volume can be provided in a simple way and without material-removing machining in the case of the production as an injection molded part.

BRIEF DESCRIPTION OF THE DRAWINGS

One preferred exemplary embodiment of the hydrostatic piston engine according to the disclosure will be explained in detail in the following description and using the drawing, in which.

DETAILED DESCRIPTION

Figure 1:
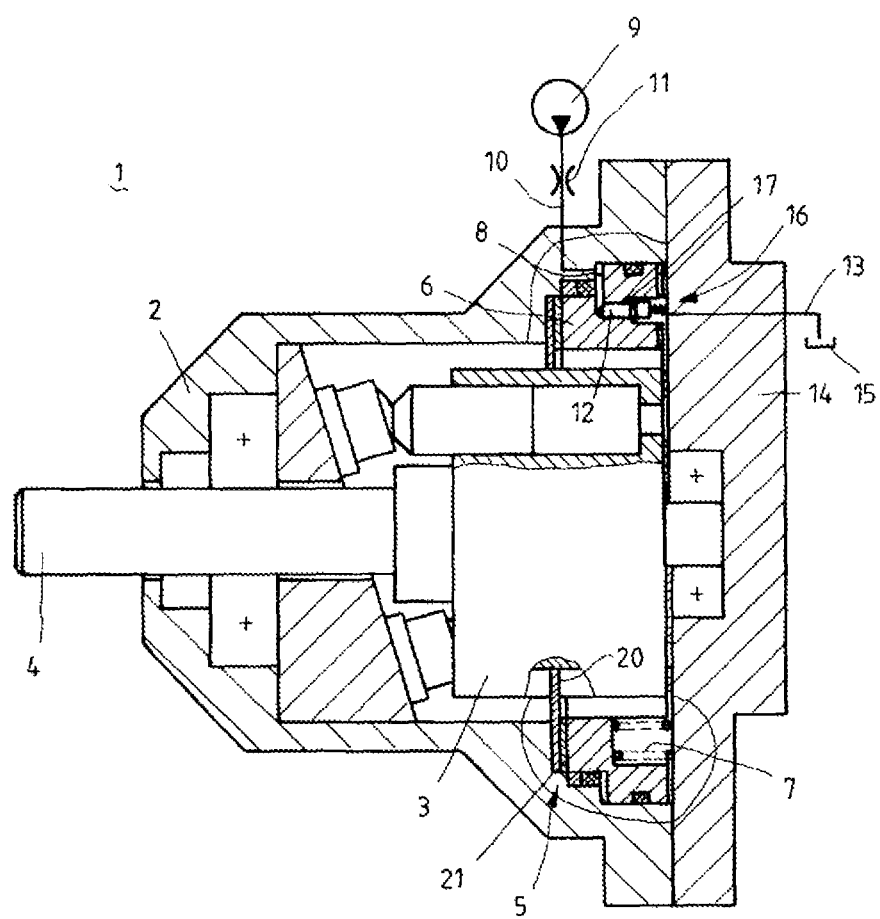
FIG. 1 shows a greatly simplified illustration of a hydrostatic piston engine having the arrangement according to the disclosure for actuating the brake device, in section.

The hydrostatic piston engine 1 which is shown in FIG. 1 is an axial piston engine of swash plate configuration which can be operated as a hydraulic motor. Here, a cylinder barrel 3 is arranged rotatably in a housing 2 and is connected fixedly to a drive shaft 4 so as to rotate with it. The pistons which are arranged in a longitudinally displaceable manner in the cylinder barrel 3 are supported via sliding pads in a known manner on an oblique plane, with the result that a torque is generated on the drive shaft 4 when pressure medium is fed into the cylinder spaces.

As long as pressure medium cannot escape, for example, in the closed system, the drive shaft 4 is fixed on account of the hydraulic clamping. On account of leakage, for example during a down time of a machine, however, the pressure can drop and undesired rotation of the cylinder barrel 3 can therefore be the consequence. In order to prevent this, a brake device 5 is provided. The brake device 5 is shown in FIG. 1 in a greatly simplified manner and, in the exemplary embodiment which is shown, shows only a first disk 20 and a second disk 21. Whereas the first disk 20 is connected fixedly via a toothing system to a corresponding geometry of the cylinder barrel 3 so as to rotate with it, the second disk 21 is connected fixedly via an external toothing system to the housing 2 so as to rotate with it. If the second disk 21 is then loaded with an axial force, the first disk 20 is clamped between the first disk 20 and the housing 2 and a braking action is therefore generated on the cylinder barrel 3.

This force in the axial direction is brought about by an actuating element which is configured as a thrust ring 6 in the example which is shown. An arrangement of this type of a brake device 5 in the form of a multiple disk brake as parking brake is known per se from the prior art. In order to generate the force in the axial direction, a plurality of springs 7 are provided in a manner which is distributed over the circumference, which springs 7 are arranged between a cover 14 which closes the housing 2 and the thrust ring 6.

On its outer circumference, the thrust ring 6 has a radial step which interacts with a corresponding geometry of the housing 2 in such a way that, when the thrust ring 6 bears against the second disk 21, a pressure space 8 is formed on account of a remaining spacing of at least part of the circumference of the step. For this purpose, the housing 2 has a corresponding step. In order to avoid undesired pressure medium loss from said pressure space 8, an O-ring seal which is arranged on the outer circumference of the thrust ring 6 is provided in each case on both sides of the radial step, which O-ring seal seals against the housing 2. The pressure space 8 is connected to the pressure medium source which, for the sake of simplicity, is shown as a pump 9 in FIG. 1.

A first throttle point 11 is provided in the connection 10 between the pump 9 and the pressure space 8. The first throttle point 11 is provided for reducing the pressure of the pressure medium source 9, with the result that a pressure which is reduced in comparison with the pressure of the pressure medium source 9 prevails in the pressure space 8.

Furthermore, the pressure space 8 is connected via a relief channel 12 which is arranged in the thrust ring 6 to the housing inner volume of the housing 2 of the hydrostatic piston engine 1 as pressure medium sink. Furthermore, said interior of the hydrostatic piston engine 1 is connected to a tank volume 15 via a tank line 13 (shown only diagrammatically).

In the relief channel 12, a second throttle point 17 is formed in the thrust ring 6. In the exemplary embodiment according to FIG. 1, said second throttle point 17 is provided upstream of a non-return valve 16 and forms a pressure-holding valve device with the latter. However, the second throttle point 17 could likewise be provided downstream of the non-return valve 16.

Figure 2:
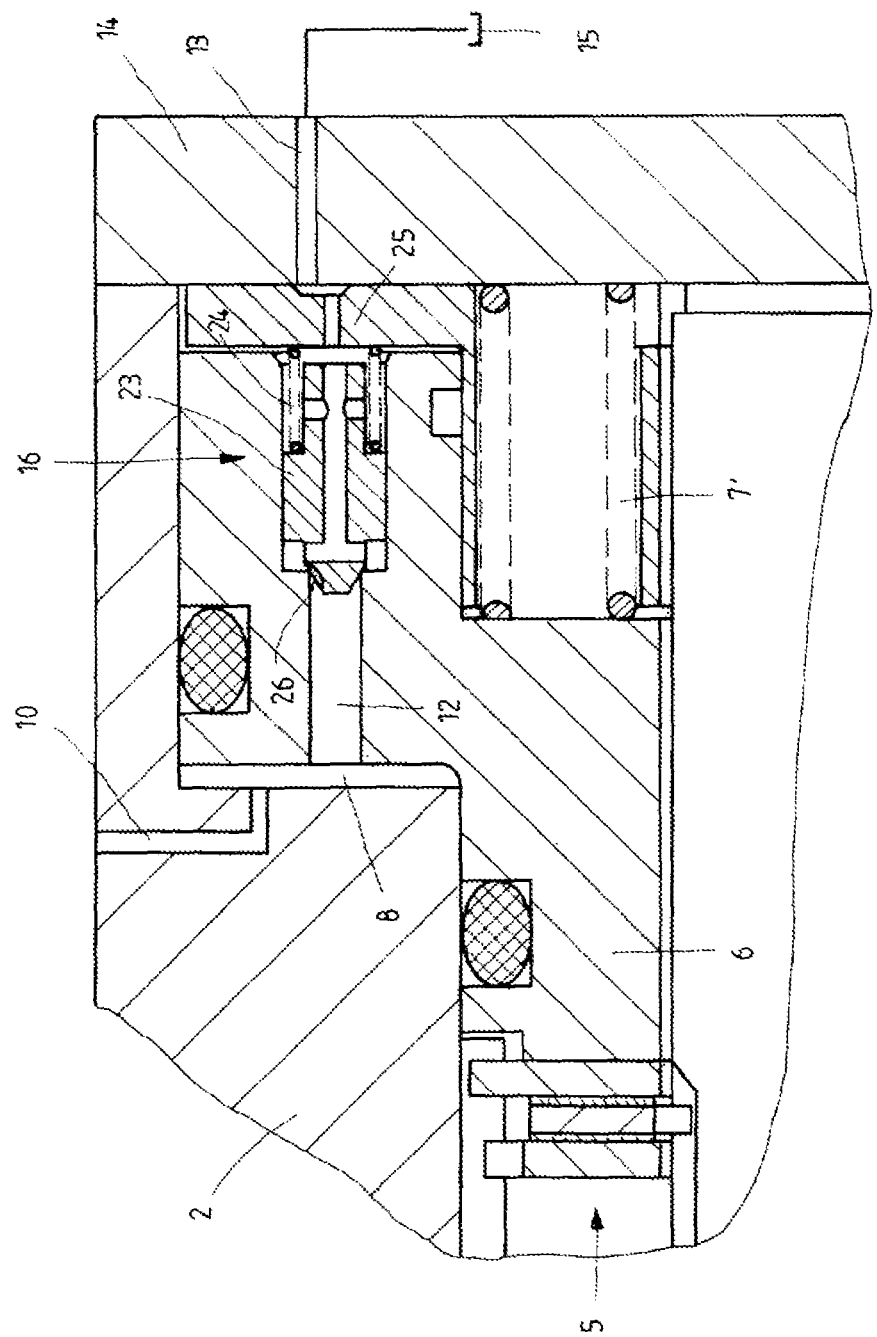
FIG. 2 shows an enlarged illustration in the region of the pressure-holding valve device according to a first exemplary embodiment which is inserted into the actuating element.

Before the method of operation of the hydrostatic piston engine 1 according to the disclosure and its brake device 5 are now discussed in detail, first of all an arrangement of a pressure sequence valve 16' in the thrust ring 6 is to be explained as the preferred embodiment of the pressure-holding valve device using the enlarged illustration of this region in FIG. 2.

With regard to the structural configuration, FIG. 2 is therefore modified in comparison with the simple illustration of FIG. 1, with the result that, in particular, the brake device 5 also contains a multiple disk assembly which shows more than the merely two disks shown in FIG. 1.

The relief channel 12 is configured as a stepped channel which penetrates the thrust ring 6 in the axial direction. The end with the smaller cross section is connected to the pressure space 8 and opens at the pressure-loaded face on the radial step of the thrust ring 6. A closing body 23 of the pressure sequence valve 16' is arranged in the radially widened region of the relief channel 12. The closing head of said closing body 23 interacts in a virtually sealing manner with the radial step of the relief channel 12 in the closed position of the throttle non-return valve 16. In order to fix the opening pressure of the pressure sequence valve 16', a closing spring 24 is provided which, at an end which faces away from the closing head, surrounds a region of the closing body 23, which region is of reduced radial dimensions. The closing spring 24 is clamped between two spring bearings, of which a first spring bearing is formed by a shoulder on the closing body 23 and a second spring bearing is formed by a bearing face on a guide ring 25 which is produced from plastic. Said guide ring 25 is arranged between the thrust ring 6 and the cover 14. Guide bushes for the thrust ring in the sense of springs 7' which load activation of the brake are formed integrally on it. The closing spring 24 is dimensioned in such a way that the opening pressure of the pressure sequence valve 16' is adjusted to a level of, for example, 13 bar on the connected thrust ring 6. Moreover, the thrust ring 6 moves only by such a small travel that the change caused by said travel in the force of the closing spring 24 lies within the range of the spring tolerances. However, the second spring bearing can also be formed by a circlip which is inserted into a groove at the end of the widened region of the relief channel 12. In the case of a movement of the thrust ring 6, the entire unit is then displaced in the axial direction in the housing 2. An influence of the position of the thrust ring 6 on the effectiveness of the throttle non-return valve 16 is therefore avoided completely. A transverse bore is formed in the closing body 23 downstream of the sealing seat. Said transverse bore is connected to a longitudinal bore and, via the latter and a transverse bore in the closing body 23 and via an annular groove in the thrust ring 6, to the space between the thrust ring 6 and the guide ring 25 and, via a bore and an annular groove in the guide ring 25, to the tank line 13.

In order to produce the additional throttle point which is provided parallel to the pressure sequence valve 16' as viewed hydraulically, at least one groove 26 is provided on the sealing seat of the closing head, which sealing seat is otherwise circular in cross section. For reasons of symmetry, said grooves can also be provided multiple times distributed over the circumference. The use of grooves of this type has the advantage that contaminants which possibly accumulate in the region of said throttle points when the throttle non-return valve 16 is closed are rinsed away via the fluid which flows past when the throttle non-return valve 16 is opened. The function of the arrangement is therefore ensured in the long term. In general, said grooves or grooves can produce cross sections which can be considerably smaller than the cross section of nozzles of the type which are configured as bores. This is relevant, in particular, with regard to the second throttle point 17 which is present in the configuration of the pressure-holding valve device as a serial arrangement of the throttle point 17 with the non-return valve 16.

Figure 3:
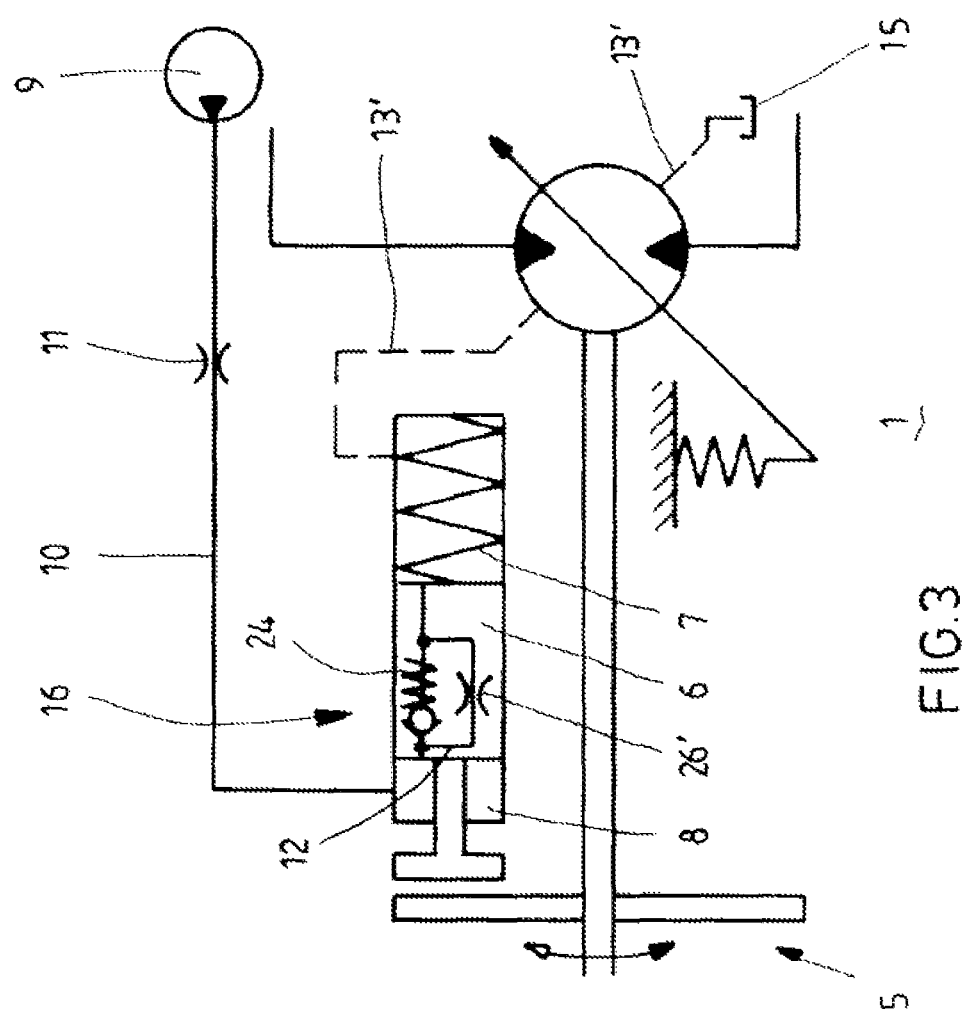
FIG. 3 shows a hydraulic circuit diagram in order to explain the method of operation of the brake device of the hydrostatic piston engine.

The function is now to be explained using the diagrammatic illustration of FIG. 3. The thrust ring 6 is provided for transmitting a pressing force of the brake device 5 and for releasing the brake. The thrust ring 6 is loaded in the axial direction by the springs 7 with a force which moves it toward the disk of the brake device 5. In the opposite direction, the thrust ring 6 is loaded on a face with a pressure which prevails in a pressure space 8. Said pressure space 8 is connected via the connection 10 to the pressure medium source 9. In addition, the pressure space 8 is connected via the relief channel 12 and the connecting channel 13' to a tank volume 15. The pressure sequence valve 16 is then arranged in the thrust ring 6. The pressure sequence valve 16 only opens above a minimum pressure in the pressure space 8. Said minimum pressure is predefined by closing spring 24. The minimum pressure which is equal to the opening pressure of the pressure sequence valve 16 is selected in such a way that it lies just above the pressure which is required to release the brake device 5. If a sufficient pressure prevails in the pressure space 8, the thrust ring 6 is displaced to the right in FIG. 3 counter to the force of the springs 7 and the brake device 5 is therefore released. Here, as a rule, pressure medium is delivered continuously from the pressure medium source 9 under pressure dissipation to the pressure level of the tank volume 15. If there is a sudden drop in pressure which leads to the pressure which prevails in the pressure space 8 falling below the pressure level which is required to release the brake device 5, the throttle non-return valve 16 closes. A connection between the pressure space 8 and the tank volume 15 is then possible only via the additional narrow throttle point 26'. By way of said additional throttle point 26', it is made possible that a desired pressure dissipation in the pressure space 8 is possible, by a throttled flow path existing between the pressure space 8 and the tank volume 15 despite the closed pressure sequence valve 16. The response times can be set via a suitable selection of the sizes of the first and second throttle points and additionally of the additional throttle point 26'.

By way of the arrangement according to the disclosure with the use of the pressure sequence valve 16 or its non-return valve function, it is possible to provide the pressure which prevails in the pressure space 8 for releasing the brake device 5 merely just above the minimum pressure which is required for this purpose. As a result, the thrust ring 6 can be produced, in particular, from plastic, which has advantages in terms of production technology and also saves costs.

Figure 4:
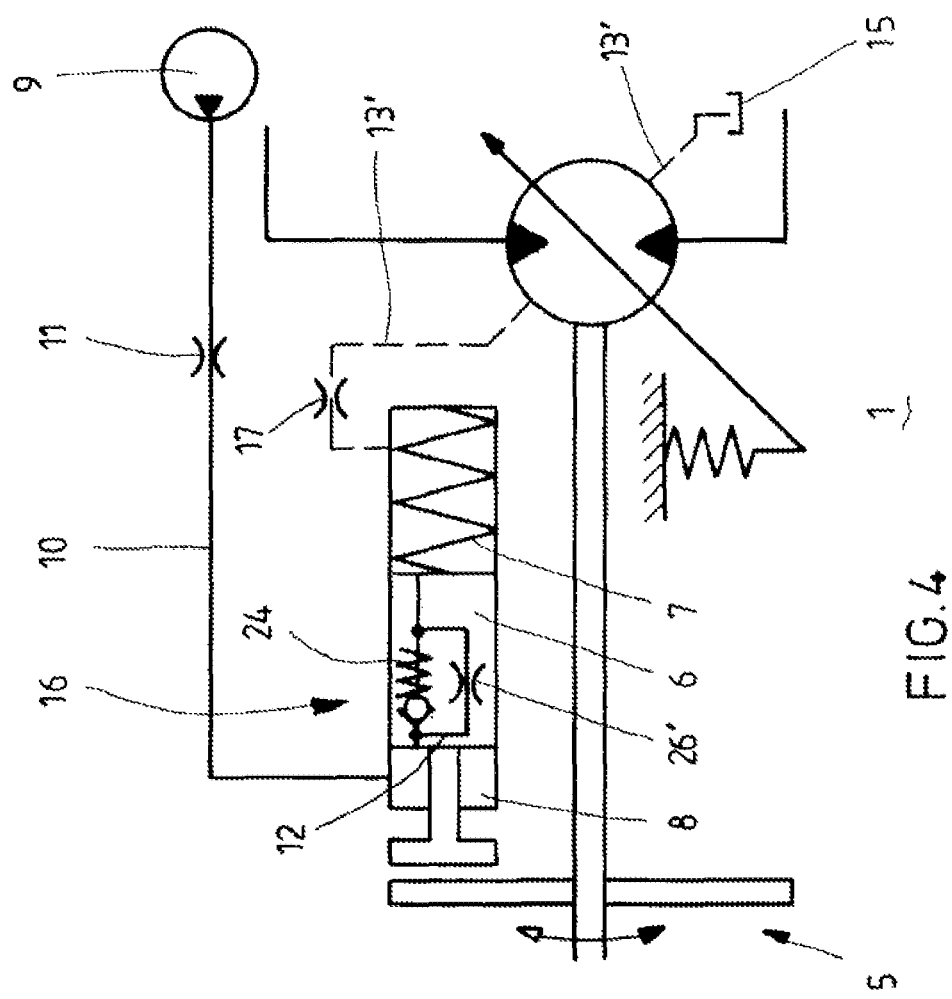
FIG. 4 shows a hydraulic circuit diagram in order to explain an alternative embodiment of the pressure-holding valve device.

FIG. 4 shows a hydraulic circuit diagram of the alternative embodiment of the pressure-holding valve device. Two throttle points 11, 17 are arranged in series, the first throttle point 11 lying upstream of the pressure space 8, and in contrast the second throttle point 17 lying downstream thereof. Together with the non-return valve 16, the second throttle point forms the pressure-holding valve device. In contrast to the exemplary embodiment of FIGS. 2 and 3, the pressure drops at the non-return valve 16 and the second throttle point 17 are added here in the case of an open non-return valve 16. The pressure in the pressure space therefore lies at a higher level than is actually required.

The invention claimed is:
1. A hydrostatic piston engine comprising:
 a rotor;
 a brake device configured to produce a braking force on the rotor;
 an actuating element configured to actuate the brake device, the actuating element configured to release the brake device when a hydraulic force is applied on a surface of the actuating element in a pressure space, the pressure space connected via a first throttle point to a pressure medium source, and the pressure space configured to be connected to a pressure medium sink; and
a pressure-holding valve device configured to open in a direction of the pressure medium sink and arranged between the pressure space and the pressure medium sink,
wherein an opening pressure of the pressure-holding valve device is at least equal to a pressure in the pressure space which is required to release the brake device,
wherein a second throttle point is formed parallel to the pressure-holding valve device, and
wherein the pressure space is connected to the pressure medium sink via the second throttle point.

2. The hydrostatic piston engine as claimed in claim 1, wherein the pressure-holding valve device is configured as a pressure sequence valve.

3. The hydrostatic piston engine as claimed in claim 1, wherein:
the pressure-holding valve device has a non-return valve, and
the pressure-holding valve device has an additional throttle point arranged serially with respect to the non-return valve.

4. The hydrostatic piston engine as claimed in claim 1, wherein the pressure-holding valve device is provided in the actuating element.

5. The hydrostatic piston engine as claimed in claim 1, wherein the actuating element is configured as a plastic ring.

6. The hydrostatic piston engine as claimed in claim 1, wherein the pressure-holding valve device is configured to open in the direction to the pressure medium sink when the brake device is released.

7. A hydrostatic piston engine comprising:
a rotor;
a brake device configured to produce a braking force on the rotor;
an actuating element configured to actuate the brake device, the actuating element further configured to release the brake device when a hydraulic pressure is applied on a surface of the actuating element in a pressure space; and
a pressure-holding valve device located in direct fluid communication with the pressure space and configured to open based on the hydraulic pressure in the pressure space, such that when a pressure in the pressure space is sufficient to release the brake device the same pressure is applied to the pressure-holding valve device, the pressure-holding valve device configured to open in a direction of a pressure medium sink,
wherein an opening pressure of the pressure-holding valve device is greater than or equal to the pressure in the pressure space which is sufficient to release the brake device,
wherein a first throttle point connects the pressure space to a pressure medium source,
wherein a second throttle point is formed parallel to the pressure-holding valve device, and
wherein the pressure space is connected to the pressure medium sink via the second throttle point.

8. The hydrostatic piston engine as claimed in claim 7, wherein the pressure-holding valve device is configured as a pressure sequence valve.

9. The hydrostatic piston engine as claimed in claim 7, wherein:
the pressure-holding valve device has a non-return valve, and
the pressure-holding valve device has an additional throttle point arranged serially with respect to the non-return valve.

10. The hydrostatic piston engine as claimed in claim 7, wherein the pressure-holding valve device is located within the actuating element.

11. The hydrostatic piston engine as claimed in claim 7, wherein the actuating element is configured as a plastic ring.

12. The hydrostatic piston engine as claimed in claim 7, wherein the pressure-holding valve device is configured to open in the direction to the pressure medium sink when the brake device is released.

13. A hydrostatic piston engine comprising:
a rotor;
a brake device configured to produce a braking force on the rotor;
an actuating element configured to actuate the brake device, the actuating element configured to release the brake device, when a hydraulic force is applied on a surface of the actuating element in a pressure space, the pressure space connected via a first throttle point to a pressure medium source, and the pressure space configured to be connected to a pressure medium sink; and
a pressure-holding valve device arranged between the pressure space and the pressure medium sink and configured to open in a direction to the pressure medium sink when the brake device is released,
wherein an opening pressure of the pressure-holding valve device is greater than or equal to a pressure in the pressure space which is required to release the brake device,
wherein a second throttle point is formed parallel to the pressure-holding valve device, and
wherein the pressure space is connected to the pressure medium sink via the second throttle point.

14. The hydrostatic piston engine as claimed in claim 13, wherein the pressure-holding valve device is configured as a pressure sequence valve.

15. The hydrostatic piston engine as claimed in claim 13, wherein:
the pressure-holding valve device has a non-return valve, and
the pressure-holding valve device has an additional throttle point arranged serially with respect to the non-return valve.

16. The hydrostatic piston engine as claimed in claim 13, wherein the pressure-holding valve device is provided in the actuating element.

17. The hydrostatic piston engine as claimed in claim 13, wherein the actuating element is configured as a plastic ring.

* * * * *